July 25, 1933.  J. B. NEWSOM  1,919,801
MACHINE FOR MAKING BUILDING BLOCKS
Filed Feb. 12, 1931   2 Sheets-Sheet 1
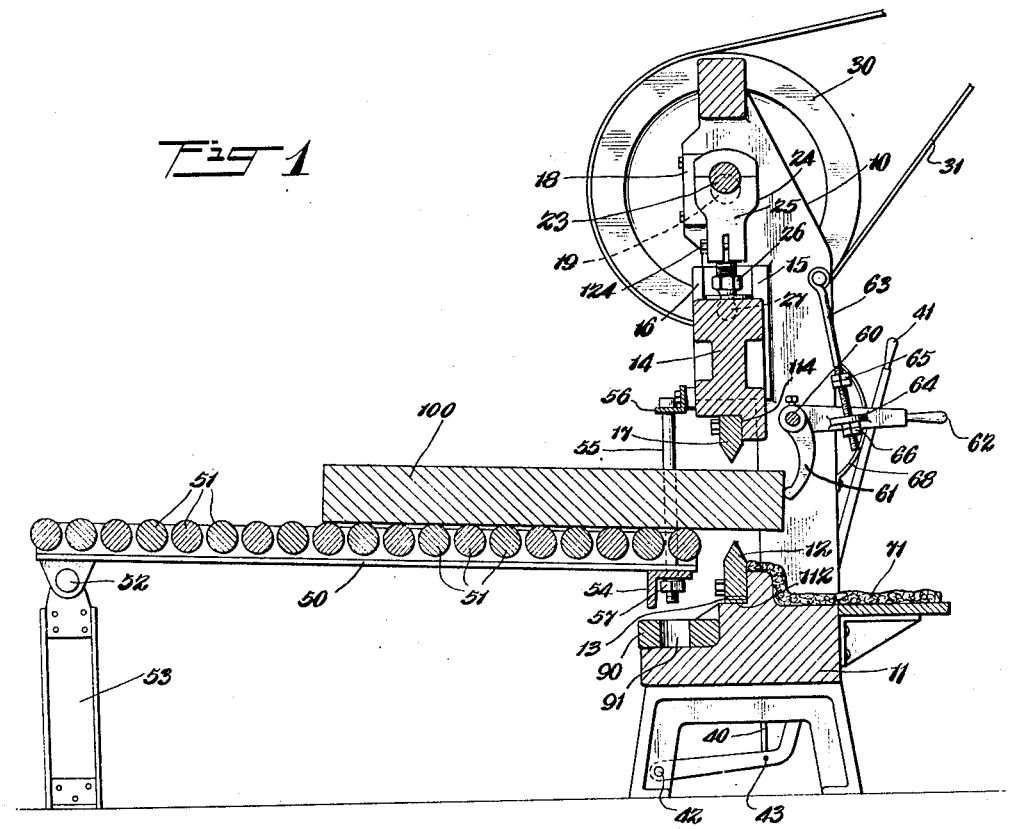
INVENTOR
John B. Newsom
BY Austin & Dix
ATTORNEYS July 25, 1933.  J. B. NEWSOM  1,919,801
MACHINE FOR MAKING BUILDING BLOCKS
Filed Feb. 12, 1931    2 Sheets-Sheet 2
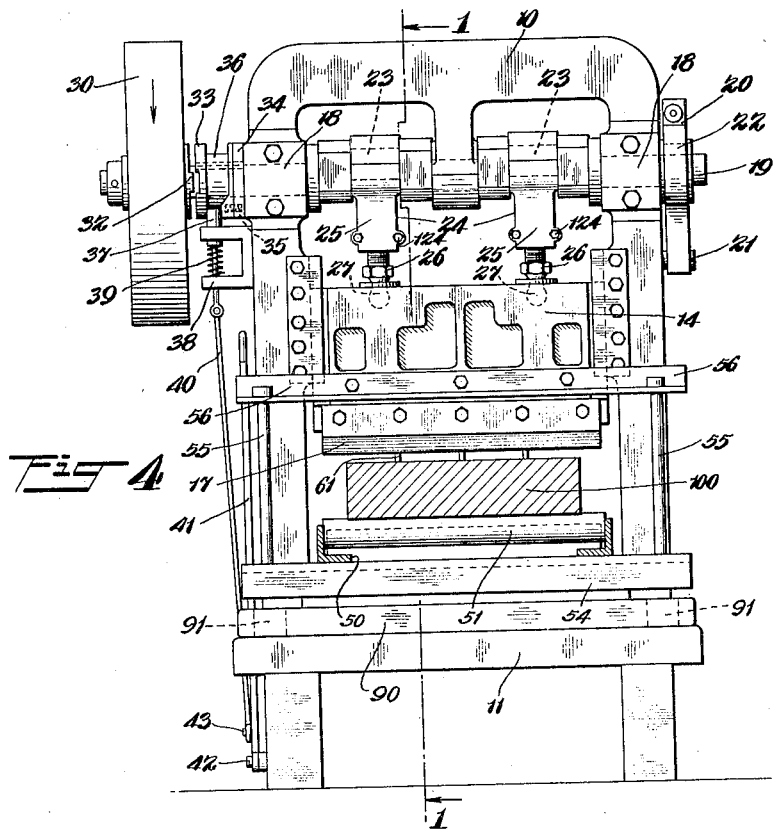
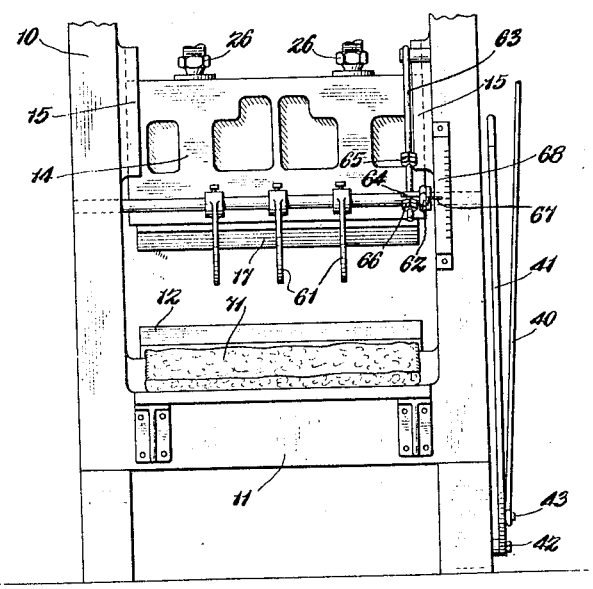
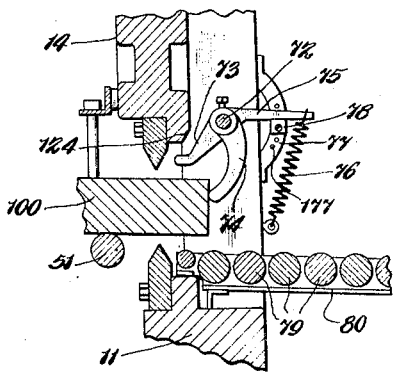
INVENTOR
John B. Newsom
BY Austin & Dep
ATTORNEYS Patented July 25, 1933

1,919,801

UNITED STATES PATENT OFFICE

JOHN B. NEWSOM, OF BLOOMINGTON, INDIANA

MACHINE FOR MAKING BUILDING BLOCKS

Application filed February 12, 1931. Serial No. 515,201.

The invention relates to the art of stone cutting, and more particularly to a machine for cutting stone blocks.

According to one manner of practicing the invention, a machine for cutting stone is provided having upper and lower jaws, the lower jaw being stationary and having a knife secured thereto and the upper jaw being movable and also having a knife secured thereto. The knives are preferably relatively sharp and their cutting edges are adapted to move in the same plane of movement. Suitable devices may be provided for adjusting the minimum gap between the knife edges for different thicknesses of stone.

Suitable devices may be provided for feeding the stone slabs to the knives. The feeding devices may comprise a substantially horizontal table having rollers on which the slab slides toward the knives by gravity. The inner end of the table may be connected to the upper jaw of the machine so that, as the upper jaw moves downwardly, the table will also move downwardly and rest the slab on the lower knife blade.

Suitable stop devices may be provided to limit the movement of the stone slab between the knives and to thereby control the size of the block which is cut from the slab. Suitable receiving devices may also be provided either in the form of a pad for receiving the blocks as they are cut, or in the form of a conveyor for conveying the blocks away from the machine.

The invention also consists in certain new and original features of construction and combinations of parts hereinafter set forth and claimed.

Although the novel features which are believed to be characteristic of this invention will be particularly pointed out in the claims appended hereto, the invention itself, as to its objects and advantages, and the manner in which it may be carried out, may be better understood by referring to the following description taken in connection with the accompanying drawings forming a part thereof, in which Fig. 1 is a vertical section through a machine according to the invention taken on the line 1—1 of Fig. 4;

Figs. 2 and 3 represent positions of the knife blades when they are operating upon the stone slab;

Fig. 4 is an end view of the machine;

Fig. 5 is an end view opposite to that of Fig. 4;

Fig. 6 is a detail illustrating a modified form.

In the following description and in the claims parts will be identified by specific names for convenience, but they are intended to be as generic in their application to similar parts as the art will permit.

Like reference characters denote like parts in the several figures of the drawings.

In the drawings accompanying and forming part of this specification, practical commercial embodiments of the invention are shown, but as such illustrations are primarily for purposes of disclosure, it will be understood that the structures may be modified in various respects without departure from the broad spirit and scope of the invention as hereinafter defined and claimed.

Referring now to the drawings, the cutting apparatus comprise a massive frame, indicated by 10, having a stationary lower jaw 11 and a movable upper jaw 14 which slides between ways 15 and 16.

The lower jaw 11 carries a straight horizontal knife 12 suitably bolted in a seat, indicated by 112. If desired, shims 13 may be provided to adjust the height of the knife 12 for a purpose hereinafter described more in detail.

The frame has a plurality of bearings 18 which journal a crank shaft 19 having crank pins 23. Attached to the crank shaft 19 is a brake drum 22 around which is positioned a brake band, indicated by 20, which is suitably anchored to the frame at 21, the brake band being for the purpose of stopping the rotation of the crank shaft promptly after the power has been withdrawn therefrom.

The crank pins 23 are in line with each other and are connected to the upper jaw 14 by connecting rods 24. Each connecting rod 24 has a split sleeve 25 into which is threaded a bolt member 26 having a ball and socket connection 27 with the upper jaw 14. By unloosening the bolts 124 connecting the sides of the split sleeves the bolt members 26 may be rotated to adjust the length of the connecting rods 24.

The jaw 14 has a seat 114 similar to the seat 112 which carries a removable knife 17 similar to the knife 12. Since the throw of the crank pins 23 is constant, the movement of the upper jaw 14 is constant but the minimum gap between knives 12 and 17 may be varied either by adjusting the length of the connecting rods 24 or by changing the number of shims 13 under the lower knife 12, or by both of these manners.

For driving the crank shaft 19 a fly wheel 30 may be provided, being driven from a suitable source of power as by a belt 31. The fly wheel 30 rotates freely on crank shaft 19 and has secured thereto a plurality of dogs 32 forming part of a one-revolution clutch, which will now be described.

Keyed to the crank shaft 19 is a stationary collar 34 and a movable collar 33 which has a plurality of recesses to receive the dogs 32. A plurality of springs 35 are provided to continuously urge the movable collar 33 against the fly wheel 30.

For controlling the engagement of the clutch a dog 37 is provided engaging in a cam groove 36 in the collar 33. The dog 37 is controlled by a rod 40 and a spring 39 is provided to continuously urge the dog 37 in the cam groove 36. A suitable support 38 is provided for the dog 37.

The control rod 40 is connected to a hand lever 41 by a pivot 43, the hand lever 41 being pivoted to the frame at 42. It will thus be seen that by throwing the hand lever 41 the dog 37 is withdrawn from the cam groove 36, allowing the one-revolution clutch to engage to operate the upper jaw 14. As soon as the handle 41 is released the dog 37 engages the wider part of the cam groove 36, having no effect on the one-revolution clutch until the movable collar 33 rotates again to the position shown in Fig. 4 when the dog 37 riding into the narrow part of the cam groove 36 causes the clutch to disengage. The brake 20—22 stops the crank shaft almost instantly with the upper jaw 14 in substantially its topmost position.

For feeding a slab of stone to the jaws a table 50 is provided made up of a suitable frame pivoted at 52 to support 53 and supported at its other end by a plurality of rods 55 suspended from an angle iron 56 secured to the upper jaw 14. The rods 55 pass loosely through lower angle iron 54 secured to the table frame. Nuts 57 are provided on the ends of rods 55 to adjust the height of the end of the table. A plurality of rollers 51 are journalled in the table frame and the table is arranged at a slight sloping position to cause the slab, indicated by 100, to move forward by gravity when the knives are apart, as indicated in Fig. 1.

For limiting the lowermost position of the table 50 and thereby preventing the slab 100 from dropping too far after a cut is made, a stop 90 having clearance holes 91 is placed upon the lower jaw 11 of the machine. Thus the table 50 cannot drop any further than a small distance below the cutting edge of the lower knife 12, but the rods 55 and nuts 57 are permitted to move along with the upper jaw 14 into the holes 91. It will be understood that with different heights of lower knife 12 different size stop members 90 may be used.

For stopping the feed of the slab 100, stop devices are provided comprising a rod 60 journalled in the frame 10 having a plurality of fingers or stop members 61 secured thereto. A hand lever 62 may also be secured to the rod 60 to control the position of the fingers 61.

For controlling the position of the hand lever 62 a rod 63 may be secured to the frame 10 having spaced sets of nuts 65 and 66 on opposite sides of an abutment 64 on the handle 62. Thus, the nuts 66 control the position of the fingers 61 and also the position of the slab 100 when being cut.

If desired, a scale may be provided to adjust the stopping device for blocks of the desired size. The scale may comprise a curved member 68 secured to the frame and a pointer 67 secured to the handle 62. The curved member 68 may be graduated to the block widths (size in the direction of slab travel) directly so that the nuts 66 can be set with the stop member 61 in proper position.

In the stop mechanism above described the operator may manually control the lever 62 letting the block drop after it is cut and getting the stop members 61 in position to stop the slab 100 as it rolls forward.

If desired, an automatic arrangement may be provided for controlling the stopping means automatically. This is illustrated in Fig. 6.

Referring now to Fig. 6, 72 indicates the stop rod journalled in the frame of the machine having a plurality of fingers or stop members 74. A cam member or follower 73 is also secured to the rod 72 cooperating with a cam surface 124 on the upper jaw 14. A stop lever 75 is also secured to the rod 72 and is held against a stop lug 78 by a spring 76 which is strong enough to stop the stone slab 100 as it rolls forward but which can be overcome by the cam action between the jaw 14 and follower 73.

By adjusting the stop lug 78 in the holes 177 in the curved support 77 the width of the blocks to be cut can be adjusted.

If desired, a conveyor 80 comprising a suitable frame journalling a plurality of rollers 79 may be provided to receive the blocks as they are cut from the slab and to convey them away where they can be shipped or otherwise disposed of.

The operation of the machine above described is thought to be obvious to those skilled in the art from the description given above. The slab of stone to be cut is placed upon the table 50 by any suitable means such as by an overhead crane. It will roll forward by gravity until it engages the stop members 61 which have been set for the desired size block. The lever 41 is operated, causing the one-revolution clutch to engage, causing the upper jaw 14 to move downward, making a cut and then to move upward to its original position, as indicated in Fig. 1.

As the upper jaw 14 moves downward, the adjacent end of the table 50 is also moved downward, as illustrated in Fig. 2. This causes the slab 100 to rest upon the edge of the lower knife 12 in substantially horizontal position. Further downward movement of the upper jaw 14 causes the slab 100 to be pinched and cut between the knives 12 and 17. At the same time the operator raises the handle 62 allowing the block, indicated by 101, to fall on the pad 71, as indicated in Fig. 3. The lower knife 12 prevents the slab 100 from moving forward until the operator can move the lever 62 to its lower position to bring the stop member 61 into position to stop the movement of the slab which will take place as soon as the upper jaw 14 moves upwardly sufficiently to raise slab 100 off the lower knife 12.

When relatively thin slabs are being cut, there is room for each block to fall clear of the stops after the cut has been made. The blocks will not be wedged against the stops 61 by the unbroken slab. With thick slabs, however, the stops 61 must be moved to allow room for the block to fall clear. Furthermore, if the stone is not clear and breaks in an irregular surface, even with thin slabs, the blocks will some times not drop free unless the stops are moved out of the way.

If the stone is unsound so that it breaks unevenly, it is necessary to be able to adjust the stops for inequalities in the breaks. For instance, if the face of the uncut slab has a bulge on it, the stops are backed away (in a direction away from the uncut slab) a little distance so that the top of the next block will be the right width. On the other hand, if the face of the uncut slab happens to be concave, the stops must be moved forwardly or toward the slab for the same reason.

It will be appreciated that the operator, by controlling the position of the lever 62, can make a cut at any part of the stone. With a new slab, if the slab has a rough end, the first cut can square it up without wasting any more stone than is necessary. After the cut is made, the stone block is removed and the slab is allowed to roll forward for the next cut. The stop devices are therefore arranged to make quick adjustments to take care of inequalities in the stone.

The speed of operation of the machine and the knife travel will vary with the size of the blocks desired. In a machine for making small blocks up to the order of 8 inches by 16 inches in cross section it has been found that a machine having a knife travel of 2 inches and a cutting speed of 40 cuts per minute works satisfactorily. The cutting operation is slow enough to prevent excessive shattering.

With a large machine for making higher and longer blocks (in the direction of the length of the knives) up to the order of 12 inches high by 5 feet long, it has been found that a slower cutting speed is necessary. With large blocks the shearing strains must have time to develop fully before the break starts. With a machine for cutting blocks of the size last mentioned a speed of 13 cuts per minute was found to eliminate all trouble due to shattering.

In the machines for cutting larger sizes of blocks the minimum gap between knife edges can be adjusted very satisfactorily by adjusting the number of shims between the lower knife and the lower jaw. In smaller machines this adjustment may be made by adjusting the length of the connecting rods which drive the upper jaw.

For adjusting the knives for different thicknesses of slab the blades must first be set as far apart as possible to be sure of making a cut every time. For example, when cutting blocks 2 inches high the knives are adjusted so that they will not come nearer than about 1¾ inches. On higher blocks there is allowed a greater penetration. The knife travel is approximately the same for all sizes, but only as much as is needed for any particular height of block is usually used.

In general, it is desired to use as sharp blades as possible. The knife blades may have a cutting angle of the order of 60 degrees and are preferably made of special steel to stand up in use and keep their sharpness. For cutting blocks with convex fractured surfaces non-symmetrical knife blades having a blade angle of the order of 35 degrees have proven satisfactory. For an explanation of the manner of cutting blocks with concave or convex faces attention is called to copending application Serial No. 338,696, filed February 9, 1929.

It has been found that in order to cut stone satisfactorily it is necessary to use blades which are comparatively sharp and which are continuous and which are longer than the width of the slab. Furthermore, the pressure must be applied to the top and bottom faces only of the slab gradually and slowly and uniformly along substantially straight lines, first to crush grooves on both sides of the slab, and then to crack the slab between the grooves. Deep continuous grooves on both sides of the slab must be made before any part of the section starts to split. The pressure must be applied so slowly that the cleavage lines between the grooves are fully developed before the cracking occurs, otherwise the stone will often not crack properly along the desired lines and wastage will occur.

In some instances, with large machines and with large blocks, with a knife travel of 2½ inches the blades may some times cut an inch into the stone on each side of the slab before causing a break. The pressure is exerted so slowly in some cases that the knife can actually be seen to enter the stone.

Machines of the type above described have been used for cutting stone automatically and quickly in commercial quantities very successfully. By the use of the machine above described a rate of production which is sufficiently rapid for commercial operation can be maintained.

For example, with a large machine of the type illustrated, making blocks 7½ feet long (in the direction of the knives) by 20 inches high, about two carloads of blocks of this size could be made during an ordinary working day.

Furthermore, machines of the kind above described have the advantage that they may be used to cut stone which has no value for other purposes. In other words, these machines may be used to cut stone which would otherwise be wasted. Such stone may have flaws which generally affect its splitting quality. For instance, the stone may contain hard nodules of flint, or it may be almost made up of such nodules. Such stone cannot be worked by prior methods, but it can be split by machines of the above character if enough pressure is put behind the knives. For example, in one machine used to cut stone, a pressure of 500 tons is developed on the knife blades.

Other things that may spoil stone for ordinary purposes are the presence of seams of calcite or of coarse spots or of clusters of fossils. Stone containing such flaws is sufficiently sound for building purposes, but ordinarily is extremely difficult to split into good blocks without an excessive percentage of waste because the natural lines of cleavage tend to run crooked. However, this kind of stone can be made into building blocks without excessive wastage by the machine described above.

It will be understood that the present specific disclosure is given for purposes of illustration only and that other mechanisms for operating the knives may be used, such as hydraulic presses and other types of mechanical presses.

While certain novel features of the invention have been shown and described and are pointed out in the annexed claims, it will be understood that various omissions, substitutions and changes may be made by those skilled in the art without departing from the spirit of the invention.

What is claimed is:

1. A stone cutting machine comprising a single pair of relatively movable knives, means for adjusting the minimum gap between said knives for different thicknesses of slab, means for relatively moving said knives and for limiting their movement towards each other to said minimum gap, the relative movement of the knives being always the same for all values of minimum gap, said knives having their cutting edges in the same line of movement and adapted to enter between the severed pieces.

2. A stone cutting machine comprising a single pair of relatively movable knives, means for adjusting the minimum gap between said knives for different thicknesses of slab, means for relatively moving said knives and for limiting their movement towards each other to said minimum gap, the relative movement of the knives being always substantially the same for all values of minimum gap.

3. A stone cutting machine comprising a lower stationary jaw, a lower knife secured thereto, means for adjusting the height of the knife on said jaw, an upper movable jaw, an upper knife secured thereto, a rotating crank, and a connecting rod connecting said upper jaw and crank, said knives being relatively sharp and thin and adapted to enter between the severed pieces without contacting each other.

4. A stone cutting machine comprising a lower stationary jaw, a lower knife secured thereto, an upper movable jaw, an upper knife secured thereto, a rotating crank, a connecting rod connecting said upper jaw and crank, means for adjusting the length of said connecting rod, and means for limiting the approach of said knives to a finite value slightly less than the thickness of the stone slab to be cut.

5. In a stone cutting machine a pair of relatively movable knives, a feed device for feeding a slab of stone between said knives, stop means to limit the amount of feed of said slab, means for closing said knives and for causing said feed device to rest the end of the unsevered part of said slab against both said knives.

6. In a stone cutting machine, a pair of relatively movable, horizontally extending knives, a feed table for feeding by gravity a slab of stone between said knives to a substantially horizontal position when they separate, stop means to limit the amount of gravity feed of said slab, means for closing said knives and for causing said table to rest the end of said slab on said lower knife.

7. In a stone cutting machine, a pair of relatively movable, horizontally extending knives, a gravity feed table on one side of said knives for feeding a slab of stone by gravity to said knives, said knives allowing said slab to slide forward by gravity to cutting position when they separate, stop devices on the other side of said knives for stopping the forward movement of said slab, means closing said knives and to cause said table to rest the end of said slab on said lower knife, said knives preventing sliding of the slab after cutting and allowing said slab to slide forward against said stop devices when the knives separate.

8. In a stone cutting machine, a pair of relatively movable, horizontally extending knives, a feed table feeding a slab of stone by gravity to said knives, said knives allowing said slab to slide forward to cutting position when they separate, stop devices for stopping the forward movement of said slab, means closing said knives and to cause said table to rest the end of said slab on said lower knife, said knives preventing sliding of the slab after cutting and allowing said slab to slide forward against said stop devices when the knives separate.

9. A stone cutting machine comprising a stationary knife and a movable knife, means for adjusting the minimum gap between said knives for different thicknesses of slab, said knives having their blades and cutting edges in the same line of movement and adapted to enter between the severed pieces, a crank shaft driving said movable knife, a fly wheel, and a one-revolution clutch connecting said fly wheel and crank shaft.

10. In a stone cutting machine, a machine frame having a stationary lower jaw, a straight, horizontal knife in said lower jaw, a movable upper jaw, guides on said frame for said upper jaw, a straight, horizontal knife in said upper jaw, a crank shaft carrying a crank pin and journalled in said frame, an adjustable length connecting rod connecting said crank pin and upper jaw, a fly wheel, means for driving said fly wheel and means including a one-revolution clutch connecting said fly wheel and crank shaft.

11. In a stone cutting machine, a pair of relatively movable jaws, feeding devices for the stone, stop devices comprising a rod pivoted to the machine frame, a stop member secured to said rod, a handle secured to said rod, and a movement-limiting rod secured to said handle to limit the position of said stop member.

12. In a stone cutting machine, a pair of relatively movable jaws, feeding devices for the stone, stop devices comprising a stop member against which the stone moves, a handle controlling the position of said stop member, and indicating devices for indicating the position of the stop member and thereby the size of the block cut from the stone.

13. In a stone cutting machine, a machine frame having a stationary lower jaw, a movable upper jaw, feed devices comprising a feed table frame, members secured to said upper jaw supporting the adjacent end of said feed table frame, a support for the outer end of said table frame, and rollers on said table frame.

14. In a stone cutting machine, a stationary lower jaw, a movable upper jaw, a feed table secured to said upper jaw at one end and fixedly supported at the other end.

15. In a stone cutting machine, a machine frame having a stationary lower jaw, a straight, horizontal knife in said lower jaw, a movable upper jaw, guides on said frame for said upper jaw, a straight, horizontal knife in said upper jaw, a crank shaft carrying a crank pin and journalled in said frame, an adjustable length connecting rod connecting said crank pin and upper jaw, a fly wheel, means for driving said fly wheel, means including a one-revolution clutch connecting said fly wheel and crank shaft, feed devices comprising a feed table frame, members secured to said upper jaw supporting the adjacent end of said feed table frame, a support for the outer end of said table frame, rollers on said table frame, stop devices comprising a rod pivoted to said machine frame, a stop member secured to said rod, a handle secured to said rod, a movement-limiting rod secured to said handle to limit the position of said stop member, and indicating members, one of which is mounted to move with said stop member and the other of which is fixed to said machine frame.

16. In a stone cutting machine, a pair of relatively movable knife blades, feeding devices for the stone, stop devices comprising a stop member against which the stone moves, and means for controlling the position of said stop member, said knife blades being in the same plane and adapted to enter between the severed pieces of stone.

17. In a stone cutting machine, a single pair of relatively movable knife blades, a feeding device for imparting a feeding movement to a slab of stone to a position between said knife blades, stop means to limit the amount of feed to said slab, said knife blades being in the same plane and adapted to enter between the severed pieces of stone, and a power supply for operating said knife blades.

JOHN B. NEWSOM.